Figure 1:
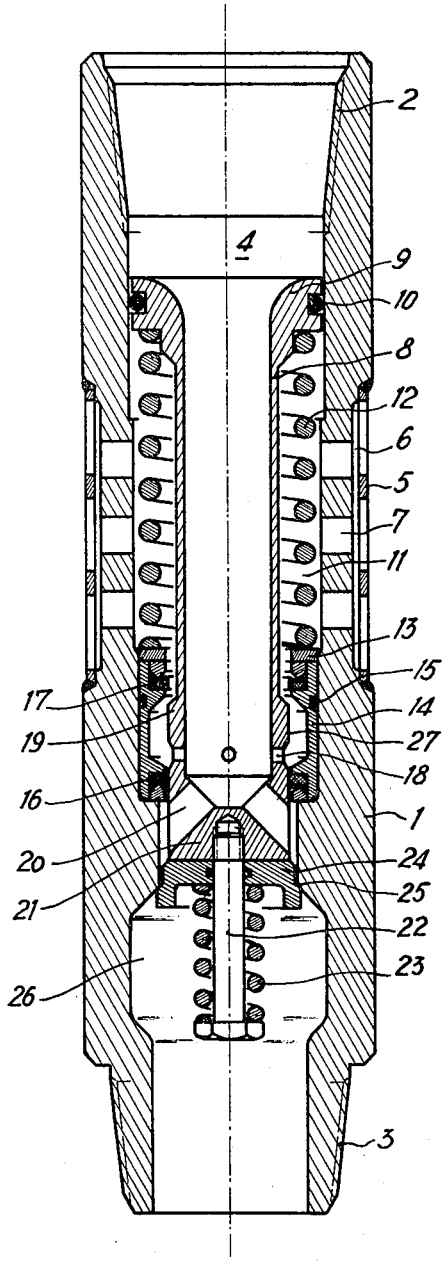

United States Patent [19]

Tiraspolsky et al.

[11] 4,072,166
[45] Feb. 7, 1978

[54] VALVE APPARATUS FOR DEEP DRILLING

[76] Inventors: Wladimir Tiraspolsky, 69 avenue Victor Cresson, 92130 Issy-les-Moulineaux; Roger François Rouviere, Quartier les Ribas, 13770 Venelles, both of France

[21] Appl. No.: 669,523

[22] Filed: Mar. 23, 1976

[30] Foreign Application Priority Data

Mar. 27, 1975 France .............................. 75 09608

[51] Int. Cl.$^2$ ............................................. E21B 41/00
[52] U.S. Cl. ................................... 137/496; 166/325; 175/318
[58] Field of Search ....................... 137/496; 166/325; 175/318

[56] References Cited

U.S. PATENT DOCUMENTS

| | | | |
|---|---|---|---|
| 2,128,352 | 8/1938 | Creighton | 175/318 X |
| 3,205,955 | 9/1965 | Whittle | 175/318 X |
| 3,409,078 | 11/1968 | Knox et al. | 175/318 X |

Primary Examiner—Robert G. Nilson
Attorney, Agent, or Firm—Young & Thompson

[57] ABSTRACT

A valve apparatus adapted for connection in a drill stem comprises a sleeve member slidably guided in a body having a longitudinal fluid passage and lateral openings that communicate with an annular space surrounding the sleeve member. The sleeve member also comprises lateral holes of small diameter and bottom orifices or channels of large diameter. In a first position of the sleeve member, the fluid flows from the drill stem towards the annular space through the holes of small diameter. When the rate of flow reaches a sufficient value, the sleeve member is moved against a biasing spring to a second position, where the small holes are closed and the large channels permit the passage of the fluid through the valve, towards the lower part of the drill stem, without any noticeable pressure drop. The sleeve member is retained in the said second position through the pressures in the drill stem and in the annular space acting on different areas of the sleeve member. When the pressure in the annular space suddenly increases, the sleeve member is moved to a third position wherein any communication between the drill stem and the annular space is avoided.

10 Claims, 3 Drawing Figures

U.S. Patent  Feb. 7, 1978  4,072,166

VALVE APPARATUS FOR DEEP DRILLING

GENERAL DISCLOSURE

This invention relates, generally, to the technique of deep drilling of the ground.

This technique sometimes requires the use of devices ensuring the axial flow of circulation fluid injected into the drill stem, yet interrupting this axial continuity and connecting the interior of the stem directly with the exterior annular space when injection is broken off or when the flow descends below a certain minimum value.

This is the case, for instance, with release valves which are installed at a certain distance from the destruction tool, to ensure the filling or emptying of the stem while running in or out of the hole or where there are obstacles to the free circulation of the fluid through devices such as an underground motor and in particular a volumetric motor or a tool creating a high pressure loss.

The valves at present commercially available consist of an interior sliding sleeve held in raised position by a spring which leaves open vents or channels connecting the interior of the stem with the annular exterior.

When circulation is established by injection of fluid into the drill stem, the sleeve, whose bore is narrow in relation to the normal passage size, causes a loss of pressure and the resulting force compresses the spring, makes the sleeve descend and blocks the lateral passages to the annular section.

There are several serious disadvantages to this method of proceeding. Thus, the artificial loss of pressure created to cause the valve to close constitutes a not negligible loss of energy which is costly and last throughout the circulation. Furthermore, maintaining the axial channel, below the valve, open does not prevent the penetration of drilling debris into the devices which the valve is in fact designed to protect, thus risking their clogging. In addition, it is impossible to ensure a circulation with low output but at high pressure through the drilling tool, as may prove indispensable in case of instrumentation, for example following a jamming of the tool. Finally, the use of such a valve is incompatible with the presence of safety valves which drillers are generally required to install at the base of the drill stem when there is a risk of encountering eruptive strata.

One of the objects of the invention is to provide a release valve apparatus remedying the cited disadavantages.

Another object of the invention is to provide a release valve apparatus which may be adjusted, if desired, to fulfil the function of a safety valve.

Still another object of the invention is to provide a valve apparatus adapted for connection in a drill stem comprising a body having a longitudinal fluid passage and lateral openings communicating said longitudinal passage with the exterior of said body; a sleeve member slidably mounted within said body between a first position in which fluid may flow between an upper portion of said longitudinal passage and said lateral openings, and a second position in which said fluid is prevented to flow between said passage and said lateral openings, said sleeve member being movable from said first to said second position in response to an increase of the flow from said passage to said lateral openings above a predetermined flowrate; biasing means between said body and said sleeve member for urging said sleeve member towards said first position; valve means connected to said sleeve member for preventing flow of said fluid between upper and lower portions of said longitudinal passage when said sleeve member is in said first position while allowing substantially unrestricted flow when said sleeve member is in said second position; and piston means on said sleeve member sensitive to the difference between the pressure in said passage and the pressure outside said body when said sleeve member is in said second position for maintaining said sleeve member in said second position when said difference exceeds a predetermined value.

Another object of the invention is to provide a release valve apparatus to be mounted in a drilling stem, of the type comprising a casing provided with threads linking with the stem and a sleeve movable between positions of communication and non-communication between the interior of the stem and the external annular section and subject to the action of a spring or equivalent elastic means pulling it towards this position of communication, characterised by the fact that the sleeve is in the general form of a deep dish having a base acting as a part to block at rest the axial bore of the valve casing, the sleeve having in its lateral wall small diameter holes and, towards its base, passage channels of large diameter, the sleeve also forming with the valve casing a permanent communication chamber with the external annular section. When the valve is at rest, the holes open into this chamber, and one part of the lateral wall of the sleeve can be positioned so as to cooperate with a part of the bore of the valve casing to isolate these holes communicating with the external annular section and thus to avoid communication between the shaft and the annular section.

The sleeve can have a thicker part forming an annular surface at the level of the above-mentioned small diameter holes, and the bore of the valve casing is fitted with a sealed joint with which this surface on the sleeve may cooperate by sliding. It is obvious that this arrangement could likewise be reversed if required, the joint being provided on the sleeve to cooperate with a surface or bearing on the valve casing.

According to another detail, when the valve is at rest, a part of the sleeve between the small diameter holes and the passage channels of large diameter is in contact with a sealing surface provided in the bore of the valve casing, such that the communication between the interior of the valve and the chamber itself in permanent communication with the external annular section is ensured solely through the small diameter holes.

When an increasing output of fluid is injected into the drill stem, this fluid flows through these small diameter holes, creating at this point a loss of pressure. When the difference in pressures between the interior of the valve and the exterior, resulting from the pressure loss thus created, reaches a sufficient value, it acts in the form of differential pressures on the various parts of the section of the sleeve, the resultant of which tends to compress the spring, displacing the sleeve against the action of the spring. As a result of this sliding movement, the large diameter channels open freely into the lower part of the stem, so that an axial circulation is established practically without pressure loss, and the communication between the small diameter holes and the annular section is removed, the aforesaid sleeve being held in the low position by the differential pressure created by the will be seen that this casing 1 is tubular in shape and is crossed by an axial bore indicated as a whole by the reference 4 and having sections of different diameter whose role will be described in more detail later.

A part of the wall of the casing 1 has an annular strainer 5 of wide dimension in order to reduce the risks of clogging. This strainer connects the annular external section with a small chamber 6 which itself communicates with the interior of the casing 1 via passages 7.

The sliding apparatus of the valve consists of a sleeve 8, the head 9 of which is sealed in relation to the bore 4 of the casing 1 by a sliding seal ring 10, thus forming an annular chamber 11 in which is located a spring 12 resting upon a ring 13 which itself rests on a base plate 14. The latter has, on its side facing the wall of the bore 4 of the casing 1 a stationary seal ring 15 and on the side facing the sleeve 8, two sliding seals 16 and 17.

The lower part of the sleeve 8 has a series of small diameter holes 18 formed in a thick section 19 and a series of inclined channels or passages 20 of large diameter formed in a base 21.

A bolt 22 screwed into the base 21 carries a spring 23 supported on the one hand by the head of the bolt and on the other hand by a push-valve 24, in order to hold the latter against the base 21.

In the position shown in FIG. 1, the push-valve 24 is supported against a shoulder 25 formed in the bore 4 of the casing 1 of the valve.

from this annular section towards the inside of this stem, through the holes 18. If the pressure difference caused between the outside and the inside by pressure loss due to flow of fluid through these holes 18, which acts on the head 9 of the sleeve 8 from the chamber 11, is sufficiently high, it causes this sleeve to move upwards by compression of the spring 23, to the position shown in FIG. 3. It will be seen that, in this condition, the annular surface 27 of the sleeve 8 co-operates with the seal 17 to isolate the holes 18 from the annular external section, by closing the passage normally provided between the sleeve and the seal 17.

Thus, the inside of the stem is isolated from the annular section, on the one hand where this annular surface 27 acts against the seal 17, and on the other hand by the push-valve 24.

Figure 2:
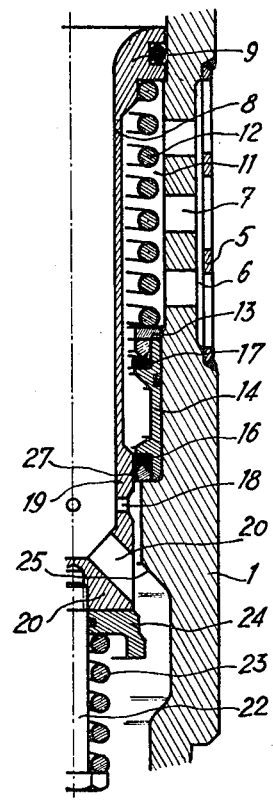
Figure 3:
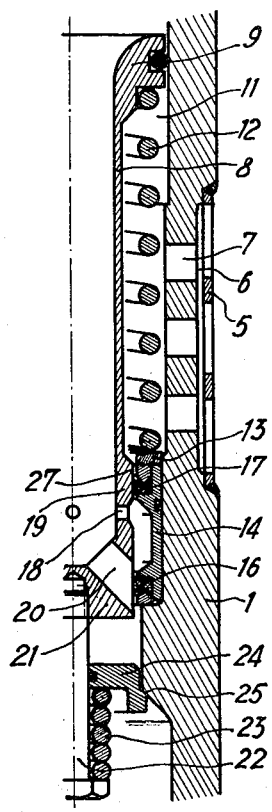

If an excess pressure occurs whilst the valve is in the position shown in FIG. 2, and if this excess pressure is of sufficient value in comparison with the injection pressure of the circulation fluid, the valve is then brought into the position shown in FIG. 1, and the same phenomenon as previously described occurs to bring the valve into the position indicated in FIG. 3, where it acts as a safety valve.

It will be noted that, account being taken of the operating method described above, it is possible at any time to inject fluid at high pressure either through the holes 18, or in the position shown in FIG. 2 by the axial channel, according to the output. Should the output of fluid injected be insufficient to cause the sleeve 8 of the valve to descend by the normal action of pressures, it will nevertheless be possible to open this valve by creating an additional pressure loss inside the sleeve, for example by dropping in a certain number of metal balls which would increase the resistance to the passage of the fluid without blocking the channels, thus causing the sleeve 8 to descend to the position shown in FIG. 2.

What is claimed is:

1. A valve apparatus adapted for connection in a drill stem comprising a body having a longitudinal fluid passage and lateral openings communicating said longitudinal passage with the exterior of said body; a sleeve member slidably mounted within said body between a first position in which fluid may flow between an upper portion of said longitudinal passage and said lateral openings, and a second position in which said fluid is prevented to flow between said passage and said lateral openings, said sleeve member being movable from said first to said second position in response to an increase of the flow from said passage to said lateral openings above a predetermined flowrate; biasing means between said body and said sleeve member for urging said sleeve member towards said first position; valve means connected to said sleeve member for preventing flow of said fluid between upper and lower portions of said longitudinal passage when said sleeve member is in said first position while allowing substantially unrestricted flow when said sleeve member is in said second position; and piston means on said sleeve member sensitive to the difference between the pressure in said passage and the pressure outside said body when said sleeve member is in said second position for maintaining said sleeve member in said second position when said difference exceeds a predetermined value.

2. The valve apparatus of claim 1 wherein said piston means comprise enlarged and reduced diameter external surfaces on said sleeve member slidably and sealingly engaging corresponding internal surfaces of said body above and below said lateral openings respectively when said sleeve member is in said second position.

3. The valve apparatus of claim 1 further including flow restriction means through said sleeve member between said longitudinal passage and said lateral openings when said sleeve member is in said first position for generating a pressure drop when the flow in said passage increases above said predetermined flowrate to apply a force overcoming said biasing means to said sleeve member thereby displacing said sleeve member towards said second position.

4. A valve apparatus adapted for connection in a drill stem comprising a body having a longitudinal fluid passage and lateral openings communicating said longitudinal passage with the exterior of said body; a sleeve member slidably mounted within said body between a first position in which fluid may flow between said passage and said lateral openings, and second and third positions below and above said first position in which the fluid is prevented to flow between said passage and said lateral openings, said sleeve member being movable from said first position to said second position in response to an increase of flow from said passage to said openings above a predetermined flowrate and from said first to said third position in response to an increase of flow from said openings to said passage above another predetermined flowrate; biasing means between said body and said sleeve member for urging said sleeve member to said first position; valve means connected to said sleeve member for preventing flow of fuid between upper and lower portions of said passage when said sleeve member is in said first and third positions while allowing substantially unrestricted flow through said passage when said sleeve member is in said second position; and, piston means on said sleeve member, sensitive to the difference of pressures in said passage and outside said body when said sleeve member is in said second and third positions for maintaining said sleeve member in said second position when the pressure in said passage less the pressure outside the body exceeds a predetermined value and for maintaining said sleeve member in said third position when the pressure outside the body less the pressure in said passage exceeds a predetermined value.

5. A valve apparatus adapted to be connected in a drill stem, comprising a casing, means provided on said casing for connecting said valve apparatus to the drill stem, a sleeve member movable between a first position wherein the inner passage of the drill stem is in communication with the annular space of the bore hole, and a second position wherein said communication is blocked, spring means biasing said sleeve member towards said first position, said sleeve member having the shape of a deep dish comprising a base and a side wall, holes of small diameter provided in said side wall, near said base, passages of large diameter provided in said base, a communication chamber arranged between said sleeve and said valve casing and communicating with said annular space, said small holes communicating between the interior of the sleeve member and said communication chamber in said first position, said spring means being located within said communication chamber, valve means connected to said sleeve member for preventing flow of said fluid through said passages of large diameter when said sleeve member is in said first position, sealing means in contact with said sleeve member for preventing said communication between the inner passage of the drill stem and said annular space of the bore hole when said sleeve member is in said second position, and pressure reactive surfaces provided on said sleeve, said surfaces being directed upwardly and downwardly respectively and being exposed to the inner part of said drill stem and to said communication chamber respectively.

6. A valve apparatus according to claim 5, comprising a first sealing surface provided on said sleeve member and a second sealing surface provided on said valve casing, whereby in said first position said holes of small diameter are open to said communication chamber and said passages of large diameter are closed, while in said second position said first and second sealing surfaces are in contact with each other and isolate said holes of small diameter from said communication chamber, while said passages are open to said drill stem below said valve apparatus.

7. A valve apparatus according to claim 5, comprising a first sealing surface provided on said sleeve member above said holes of small diameter and a second sealing surface provided on said valve casing, whereby in said second position of said sleeve member said first sealing surface rests upon said second sealing surface to isolate said holes of small diameter from said communication chamber.

8. A valve apparatus according to claim 5, comprising a first sealing surface provided on said sleeve mem-